United States Patent
Ellis et al.

(10) Patent No.: US 10,009,568 B1
(45) Date of Patent: Jun. 26, 2018

(54) DISPLAYING THE SIMULATED GAZES OF MULTIPLE REMOTE PARTICIPANTS TO PARTICIPANTS COLLOCATED IN A MEETING SPACE

(71) Applicant: International Business Machines Corporation, Armonk, NY (US)

(72) Inventors: Jason Benjamin Ellis, New York, NY (US); Thomas D. Erickson, Minneapolis, MN (US); Karin Niemantsverdriet, Eindhoven (NL); Bin Xu, Ithaca, NY (US)

(73) Assignees: INTERNATIONAL BUSINESS MACHINES CORPORATION, Armonk, NY (US); TECHNISCHE UNIVERSITEIT EINDHOVEN, Eindhoven (NL)

( * ) Notice: Subject to any disclaimer, the term of this patent is extended or adjusted under 35 U.S.C. 154(b) by 0 days. days.

(21) Appl. No.: 15/493,328

(22) Filed: Apr. 21, 2017

(51) Int. Cl.
H04N 7/15 (2006.01)
H04N 5/445 (2011.01)
G06F 3/147 (2006.01)

(52) U.S. Cl.
CPC ......... *H04N 5/44504* (2013.01); *G06F 3/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 5,400,069 A | 3/1995 | Braun et al. | |
| 5,515,491 A | 5/1996 | Bates et al. | |
| 6,466,250 B1 | 10/2002 | Hein et al. | |
| 6,637,883 B1 | 10/2003 | Tengshe et al. | |
| 7,532,230 B2 | 5/2009 | Culbertson et al. | |
| 8,581,956 B2 | 11/2013 | Robinson et al. | |
| 9,438,819 B2 | 9/2016 | Van Broeck | |
| 9,571,791 B1 * | 2/2017 | Castellani | G06F 3/0488 |

(Continued)

OTHER PUBLICATIONS

IRIS2IRIS, Online Eye Contact, "IRIS camerascreen", downloaded from the Internet Apr. 21, 2016 (http://www.iris2iris.com/en-UK/content/128/camerascreen.htm).

(Continued)

*Primary Examiner* — Creighton Smith
(74) *Attorney, Agent, or Firm* — Patent Portfolio Builders PLLC

(57) ABSTRACT

A system and method for displaying visual focus points of meeting participants uses an image capture device to generate a real-time graphical representation of a physical meeting space containing collocated meeting participants. Remote display devices display the real-time graphical representation of the physical meeting space. Each remote display device is associated with a remote meeting participant located at a remote location. A viewpoint monitoring mechanism determines a remote participant visual point of focus within the real-time graphical representation. A remote participant simulator located in the physical meeting space has a unique remote participant representation for each remote meeting participant and a remote participant visual point of focus indicator associated with each remote participant representation to simulate the remote participant visual point of focus.

20 Claims, 10 Drawing Sheets

(56) References Cited

U.S. PATENT DOCUMENTS

| | | | |
|---|---|---|---|
| 2005/0168402 A1 | 8/2005 | Culbertson et al. | |
| 2008/0297589 A1 | 12/2008 | Kurtz et al. | |
| 2011/0018963 A1* | 1/2011 | Robinson | G06Q 10/00 |
| | | | 348/14.16 |
| 2012/0281059 A1* | 11/2012 | Chou | H04L 12/1827 |
| | | | 348/14.07 |
| 2015/0085056 A1* | 3/2015 | Van Broeck | G06F 3/013 |
| | | | 348/14.1 |
| 2016/0353146 A1* | 12/2016 | Weaver | H04N 21/2662 |

OTHER PUBLICATIONS

CISCO, Immersive TelePresence, downloaded from the Internet Apr. 20, 2017 (https://cisco.com/c/en/us/products/collaboration-endpoints/immersive-telePresence/index.html).

Panning (camera)—Wikipedia, downloaded from the Internet Apr. 20, 2017 (https://en.wikipedia.org/wiki/Planning_(camera)).

* cited by examiner

DISPLAYING THE SIMULATED GAZES OF MULTIPLE REMOTE PARTICIPANTS TO PARTICIPANTS COLLOCATED IN A MEETING SPACE

FIELD OF THE INVENTION

The present invention relates to tele-conferences, video conferences and virtual meetings.

BACKGROUND OF THE INVENTION

Tele-conferences, video conferences and virtual meetings include participants at multiple physical locations interacting through a variety of devices including computers and smart phones. Often there is a main location for the meeting containing multiple participants at a single physical location and one or more remote participants located at different physical locations. The remote participants utilize a variety of methods to participate in the meeting including audio, video and computer or text based methods. However, these remote participants can experience difficulty in participating in the meeting and the current conversation. Remote participants are effectively 'invisible'. Similarly, participants collocated in a room often 'forget' about remote participants, because there are no visual cues or reminders about the existence and participation of the remote participants. Remote participants make their presence known only by speaking, which can be awkward to the meeting and can interrupt the current flow of the meeting.

Engagement of the collocated participants in the meeting is easily determined by determining where the collocated participants are looking, i.e., collocated participants shift their gazes to the participant that is speaking. Also, collocated participants will look at slides, pictures or writings on a board. A failure to visually track the activity of the meeting is strong indicator that collocated participants are not engaged in the meeting. These indications of visual engagement with the meeting activities, i.e., speakers and presentation materials, are not available to the collocated participants for the remote participants. Existing systems that support remote participation in meetings either do not do not provide collocated participants with an indication, e.g., video indication, of the visual engagement of the remote participants or require remote participants to have access to and to use expensive and specialized equipment to provide an indication of visual engagement to the collocated participants, e.g., eye tracking devices and video conferencing rooms with specialized cameras.

Therefore, a need exists for systems and methods that provide collocated participants with an indication of the visual engagement of remote participants in a meeting without the need for specialized equipment at remote locations.

SUMMARY OF THE INVENTION

Exemplary embodiments are directed to a system for displaying visual focus points of meeting participants. That system includes an image capture device to generate a real-time graphical representation of a physical meeting space comprising a plurality of collocated meeting participants and a plurality of remote display devices in communication with the image capture device to display the real-time graphical representation of the physical meeting space. Each remote display device is associated with one of a plurality of remote meeting participants located at remote locations separate from the physical meeting space. A viewpoint monitoring mechanism is included to determine a remote participant visual point of focus within the real-time graphical representation displayed in each remote display device and associated with each remote meeting participant, and a remote participant simulator is provided in communication with the viewpoint monitoring mechanism and located in the physical meeting space. The remote participant simulator includes a unique remote participant representation for each one of the plurality of remote meeting participants and a remote participant visual point of focus indicator associated with each remote participant representation and simulating the remote participant visual point of focus for each remote meeting participant.

Exemplary embodiments are also directed to a method for displaying visual focus points of meeting participants. The method includes generating a real-time graphical representation of a physical meeting space comprising a plurality of collocated meeting participants and displaying the real-time graphical representation of the physical meeting space on a plurality of remote display devices. Each remote display device is associated with one of a plurality of remote meeting participants located at remote locations separate from the physical meeting space. The method also includes determining a remote participant visual point of focus within the real-time graphical representation displayed in each remote display device and associated with each remote meeting participant and using a remote participant simulator located in the physical meeting space to display a simulated remote participant visual point of focus for each meeting participant. The remote participant simulator includes a unique remote participant representation for each one of the plurality of remote meeting participants and a remote participant visual point of focus indicator associated with each remote participant representation to display the simulated remote participant visual point of focus.

Exemplary embodiments are also directed to a computer-readable storage medium containing a computer-readable code that when read by a computer causes the computer to perform a method for displaying visual focus points of meeting participants. The method includes generating a real-time graphical representation of a physical meeting space comprising a plurality of collocated meeting participants and displaying the real-time graphical representation of the physical meeting space on a plurality of remote display devices. Each remote display device is associated with one of a plurality of remote meeting participants located at remote locations separate from the physical meeting space. The method also includes determining a remote participant visual point of focus within the real-time graphical representation displayed in each remote display device and associated with each remote meeting participant and using a remote participant simulator located in the physical meeting space to display a simulated remote participant visual point of focus for each meeting participant. The remote participant simulator includes a unique remote participant representation for each one of the plurality of remote meeting participants and a remote participant visual point of focus indicator associated with each remote participant representation to display the simulated remote participant visual point of focus.

DETAILED DESCRIPTION

Figure 1:
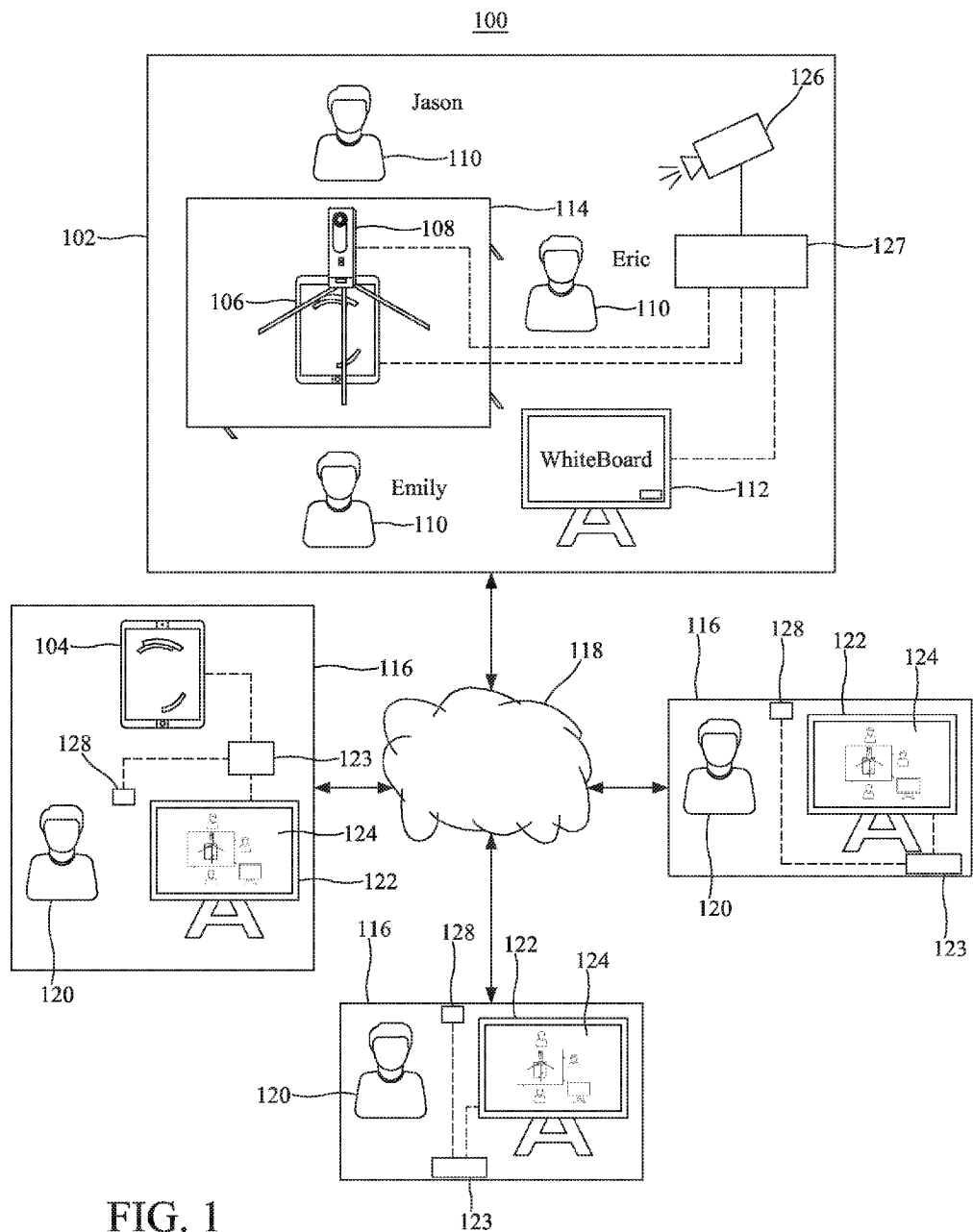
FIG. 1 is an embodiment of a system for displaying visual focus points of meeting participants.

Exemplary embodiments are directed to systems and methods for allowing a plurality of collocated participants in a first or primary physical meeting location, e.g., a meeting room or conference room, to determine the visual engagement in the meeting activities of one or more remote participants that are linked to the meeting, for example, via a video link, and that are located in one or more second or remote physical meeting locations. Each remote participant has an individual virtual viewport that allows that participant to look or to visually engage with any activity, e.g., participant, speaker, presenter or presentation material, located anywhere in the first meeting location. The visual engagement of a given remote participant includes the direction in which the individual virtual viewport associated with that given remote participant is pointed and can be referred to as the simulated or virtual gaze of that given remote participant.

The visual engagement of the remote participants is tracked, and a representation of the visual engagement or visual point of focus of the remote participants is provided to all collocated participants. In one embodiment, the visual engagement of any given remote participant is provided to all collocated participants in the physical meeting location being viewed by that given remote participant. In one embodiment, each remote participant is provided with a representation of the visual engagement of the other remote participants and the collocated participants. Providing a simulated representation of the point of focus of remote participants allows other participants to make inferences about the degree of attention of the remote participants in the meeting activities, increases engagement by the remote participants in the meeting activities resulting from communication of their visual engagement, avoids interrupting speakers while providing information on the visual engagement of remote participants and eliminates the need for expensive or proprietary equipment at the remote locations as visual engagement is determined and communicated using available and convention computers and handheld devices that have graphical displays. Therefore, exemplary embodiments facilitate the effective collaboration of collocated and remote participants to a meeting.

The visual point of focus or gaze of an individual can be used to derive a variety of inferences about that individual. For example, a first individual directs their visual point of focus at a second individual to signify attention, e.g., attention to a second individual that is speaking, to signify an expectation that the second individual is about to speak or to encourage a second individual to speak. If a first individual directs their visual point of focus away from a second individual that is either speaking or is about to speak, the first individual is indicating disinterest or is rejecting the second individual. Similarly, if a first individual directs their visual point of focus to an item or person to which the second individual is pointing, the first individual signifies attention or interest, just as failing to direct their visual point of focus may signify inattention or disinterest.

Taking the visual point of focus of multiple participants in aggregate provides a powerful effect, psychologically, on the subject of the visual point of focus. For example, when all participants in the meeting direct their visual point of focus to a speaker, indicating attention or interest, a powerful psychological effect of having all eyes upon them is communicated to the speaker. Conversely, the failure of even a single participant to direct their visual point of focus to a speaker communicates complete disinterest or rejection and can produce a feeling of embarrassment in the speaker, which may have a powerful psychological impact. If only some of the participants direct their visual point of focus to the speaker while others direct their visual engagement elsewhere, the speaker may feel that the audience is beginning to lose attention or interest. All of these cues communicated to a speaker using the visual engagement of the listeners provide information that allows speakers to communicate more effectively with their audience. As these cues are delivered visually, they do not disrupt the speaker or verbal communications.

Referring initially to FIG. 1, exemplary embodiments are directed to a system for displaying visual focus points of meeting participants 100. In particular, a simulated version of the gaze, visual engagement or visual focus of remote participants in a meeting is communicated to all of the collocated participants at the actual physical meeting space. The system includes at least one image capture device 126 that is located at the physical location 102 of the meeting. Suitable image capture devices include, but are not limited to, a still camera, a fixed field of view video camera, a pan-tilt-zoom video camera and combinations thereof. Suitable physical locations for meeting spaces include, for example, offices, lecture halls, conference rooms, operating theatres or operating rooms, court rooms, town halls and meeting rooms of governmental bodies. The image capture device or plurality of image captures devices are located within the physical location 102 of the meeting in order to capture all of the collocated meeting participants 110 and visual presentation materials 112 within the physical location. Suitable visual presentation materials include, but are not limited to, chalkboards, white boards, smartboards, projector screens, television screens, computer monitors, documents and physical displays or physical objects.

The image capture device generates a real-time graphical representation 124 of the physical meeting space. Therefore, the real-time graphical representation includes at least one of a plurality of collocated meeting participants 110 and visual presentation materials 112 in the physical location. Preferably all of the meeting participants 110 and all the visual presentation materials 112 in the physical location are included in the real-time graphical representation. Therefore, all persons and objects on which other collocated meeting participants or remote meeting participants 120 could focus during the meeting are included in the real-time graphical representation. In addition to providing a current, live or real-time graphical representation, the collocated meeting participants 110 and the visual presentation materials 112 are illustrated in accordance with their actual orientation within the physical location. In one embodiment, the physical location includes a main meeting location computing system 127 in communication with the image capture device to assist in generating and communicating the real-time graphical representation. Suitable real-time graphical representations include still and video images as well as more abstracted representations of the collocated meeting participants 110 and the visual presentation materials 112. In one embodiment, the real-time graphical representation of the physical meeting space is a spherical video image.

Exemplary embodiments utilize a video device that captures all or most of the physical meeting location containing the plurality of collocated participants. In one embodiment, the video device is an omnidirectional camera 108 that captures a spherical video image of the physical location. This spherical video image, when displayed on a typical computer screen, is highly distorted and contains a large amount of information. In one embodiment, an undistorted view of a small portion of the entire spherical image is displayed. Suitable omnidirectional cameras for capturing spherical video images are known and available in the art.

The system for displaying visual focus points of meeting participants includes a plurality of remote display devices 122 in communication with the image capture device 126 to display the real-time graphical representation 124 of the physical meeting space. Each remote display device is associated with one of a plurality of remote meeting participants 120 located at remote locations 116 separate from the physical meeting space. Suitable remote display devices include, but are not limited to, computer monitors, video displays, smartphones, tablet computers and combinations thereof. The remote display devices are in communication with the image capture device across one or more local or wide area networks 118. In one embodiment, each remote location includes a remote location computing system 123 in communication with the remote display device. In one embodiment, each remote location computing system is in communication with at least one of the image capture device and the main meeting location computing system 127. The remote location computing system is used to display the real-time graphical representation, to allow the remote user to manipulate the real-time graphical representation, and to facilitate communications between the physical meeting location and the remote locations.

The system for displaying visual focus points of meeting participants includes a viewpoint monitoring mechanism 128 located at each remote location. The viewpoint monitoring mechanism determines a remote participant visual point of focus within the real-time graphical representation displayed in each remote display device and associated with each remote meeting participant. Suitable viewpoint monitoring mechanisms include, but are not limited to, video cameras, point and click devices, remote display content monitors, text inputs and combinations thereof. In one embodiment, these viewpoint monitoring mechanisms are in communication with the remote location computing systems. The viewpoint monitoring mechanism can be integrated into the remote location computing systems and remote display devices or can be separate and independent equipment. In one embodiment, at least one of a key board and a point and click device is used by the remote meeting participant as the viewpoint monitoring mechanism to provide inputs on the current point of focus or to select portions of the real-time graphical representation. In general, the viewpoint monitoring mechanism allows the remote participant to manipulate the real-time graphical representation, e.g., move the real-time graphical representation or zoom into a portion of the real-time graphical representation, such that the manipulation indicates the focal point or viewpoint of the remote participant within the real-time graphical representation. Therefore, the viewpoint of focal point of the remote participant with respect to the meeting is determined without specialized monitoring equipment such as eye monitoring equipment.

The system for displaying visual focus points of meeting participants includes are least one remote participant simulator 106 or gaze direction indicator (GDI) located in the physical meeting space 102. The remote participant simulator is in communication with each viewpoint monitoring mechanism 128 to receive input on the remote participant visual point of focus within the real-time graphical representation displayed in each remote display device. In one embodiment, the remote participant simulator is in communication with the main meeting location computing system 127 to provide for communication with each viewpoint monitoring mechanism or remote location computing system 123 and to provide for the generation and display of the simulated remote participant points of focus. Alternatively, the remote participant simulator is an autonomous computing system such as a tablet computer.

Figure 2:
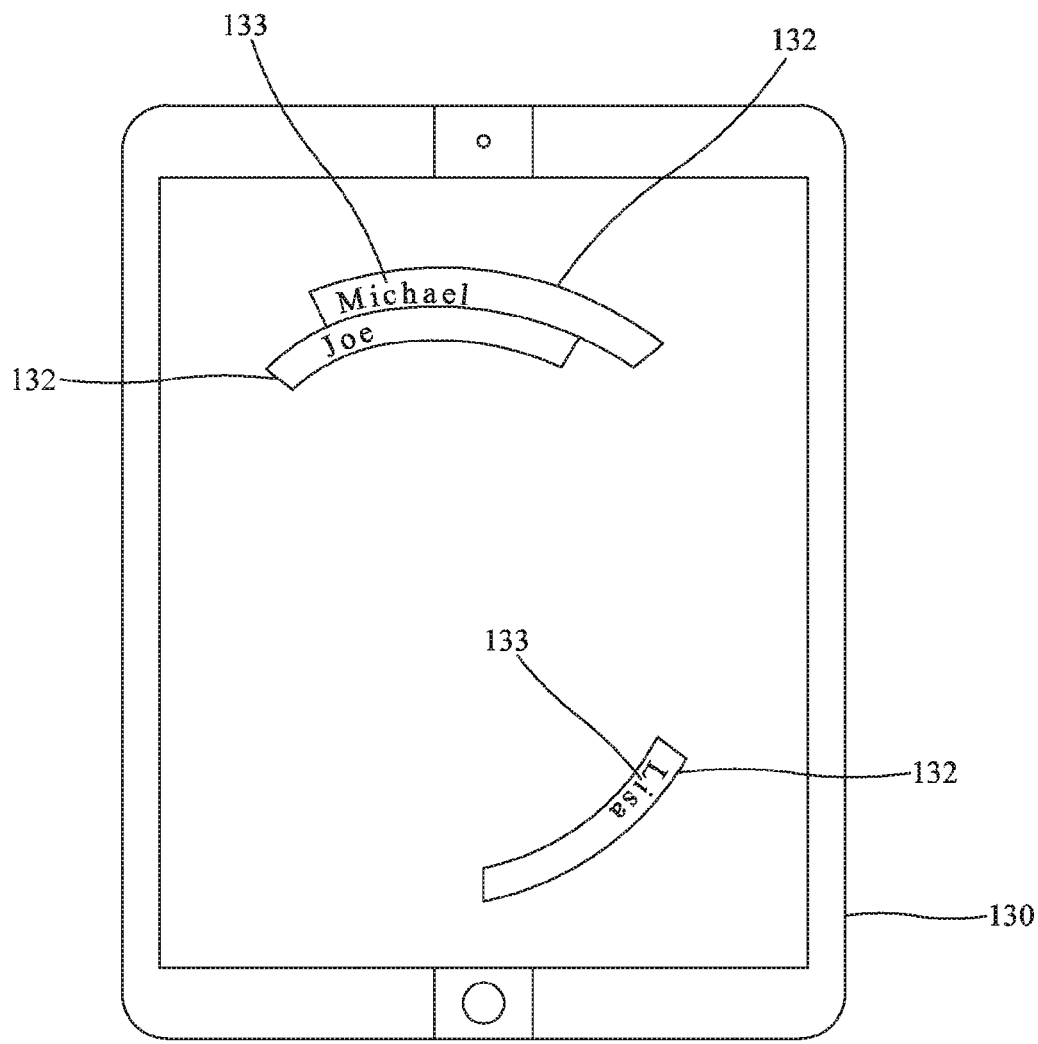
FIG. 2 is an embodiment of a remote participant simulator.

Referring to FIG. 2, in one embodiment, the remote participant simulator 106, which is represented as a tablet computer 130 includes a unique remote participant representation 132 for each one of the plurality of remote meeting participants 120. In one embodiment, each unique remote participant representation includes a remote meeting participant identifier 133. Suitable remote meeting participant identifiers include, but are not limited to, colors, graphics and alpha-numeric strings. The remote participant simulators also include a remote participant visual point of focus indicator associated with each remote participant representation. The remote participant visual point of focus indicator simulates the remote participant visual point of focus for each remote meeting participant. As illustrated, the remote participant visual point of focus indicator is a partial arc of a circle aligned with the direction in which the remote participant is looking and taking into account the field of view of the remote participant.

Other mechanisms can be used to indicate the remote participant visual point of focus indicator. In one embodiment, remote participant simulator includes visual indicators, haptic indicators, audio indicators and combinations thereof. Therefore, using the remote participant simulator or GDI to illustrate the direction of the simulated gaze or the simulated remote participant points of focus can be done visually (using a visualization, projection, light beams, or infrared beams), sonically, e.g., using a voice announcing "Bob is looking at Tom", haptically, e.g., using a collocated meeting participant's smart watch vibrating in a particular mode to indicated that the collocated meeting participant is the object of a simulated remote participant points of focus, or other tangible representations of directions. Suitable remote participant simulators include at least one of a display screen, a projector, a plurality of light beams, a plurality of infrared beams, a speaker, a television, a computer monitor, a projection screen, a table computer and combinations thereof.

In one embodiment, the system for displaying visual focus points of meeting participants includes a confidence module to compute the likelihood that the simulated gaze or simulated remote participant visual point of focus corresponds to the actual gaze or point of focus for each remote meeting participant. In one embodiment, the confidence module is executing on the main meeting location computing system 127. In one embodiment, the confidence module computes the time since the viewport or point of focus was last moved based on an assumption that motion indicates a likelihood of actual focus and that that passage of time increases a likelihood that the user has looked away, forgotten or left the room. In one embodiment, the confidence module tracks the time since the point of focus was manually refreshed or reactivated, e.g., perhaps the remote meeting participant's graphical representation dims over time, requiring input from the remote meting participant to brighten or refresh the graphical representation. In one embodiment, the confidence module uses recognition technologies located at the remote meeting participants to calculate a confidence that the remote meeting participants are looking at the graphical representation. Suitable recognition technologies include eye-tracking to determine if the remote meeting participants are looking at the graphical representation and head detection to tell if the remote meeting participants are at their remote displays and able to see the graphical representation.

In one embodiment, the remote participant simulator or GDI reflects the level of confidence that the simulated gaze or the simulated remote participant visual point of focus corresponds to the actual point of focus for each remote meeting participant. This can be reflected using a visual means, e.g., brightening a remote participant visual point of focus indicator when confidence is high, or making the ray longer, a sonic means, e.g., a voice announcing that there is a 73% likelihood that Bob is looking at Tom, or making the sound louder to reflect greater confidence and a haptic means, e.g., supplementing a visual indication with a haptic one—vibrating a smart watch—to indicate when confidence is high.

Figure 3:
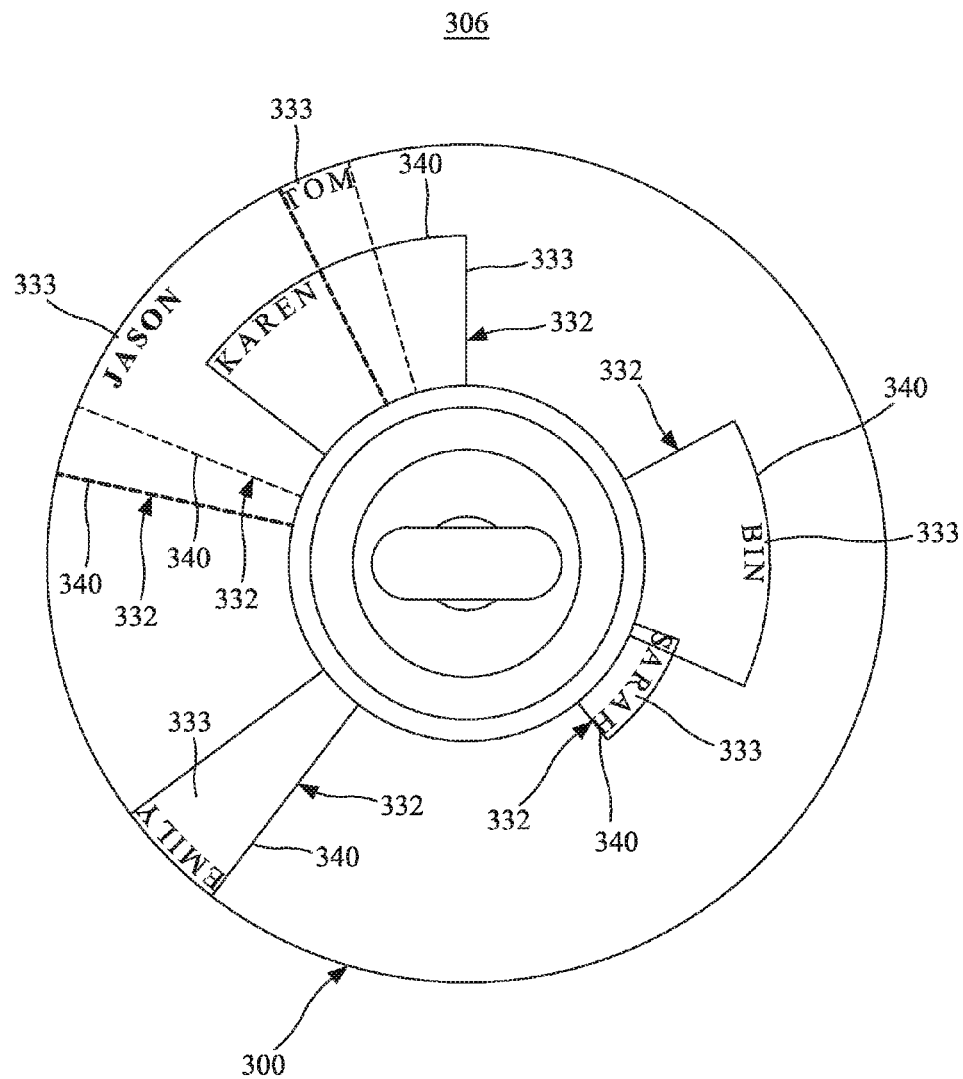
FIG. 3 is another embodiment of a remote participant simulator illustrating a confidence of corresponding to a current point of focus.

Referring to FIG. 3, in one embodiment, the remote participant simulator 306 is a screen-based or projection visualization 300 that includes a unique remote participant representation 332 for each one of the plurality of remote meeting participants. In one embodiment, each unique remote participant representation includes a remote meeting participant identifier 333, i.e., an alpha numeric label, and a remote participant visual point of focus indicator 340, which is a cone. These representations may also be color coded. The cones indicate direction, and the extent of the cones indicate a likelihood of corresponding to an actual, current point of focus within the graphical representation.

Figure 4:
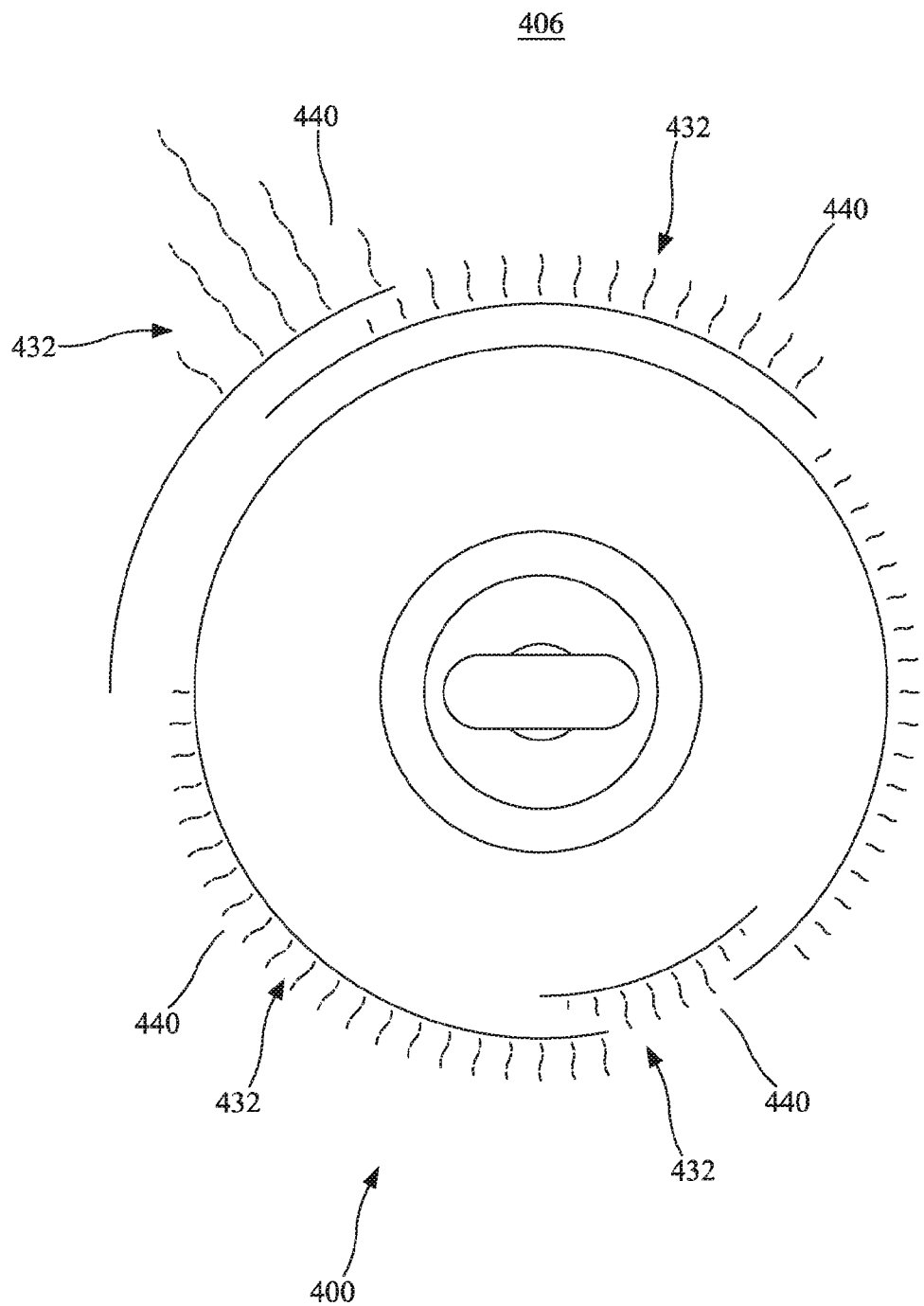
FIG. 4 is another embodiment of a remote participant simulator illustrating a confidence of corresponding to a current point of focus.

Referring to FIG. 4, in one embodiment, the remote participant simulator 406 is a light beam based visualization 400 that includes a unique remote participant representation 432 for each one of the plurality of remote meeting participants. The remote participant visual point of focus indicators 340 are colored lights, such a light emitting diode (LED) lights, which can be color coded. The colored lights indicate direction, and the intensity or extent of the lights indicating a likelihood of corresponding to an actual, current point of focus within the graphical representation.

Figure 5:
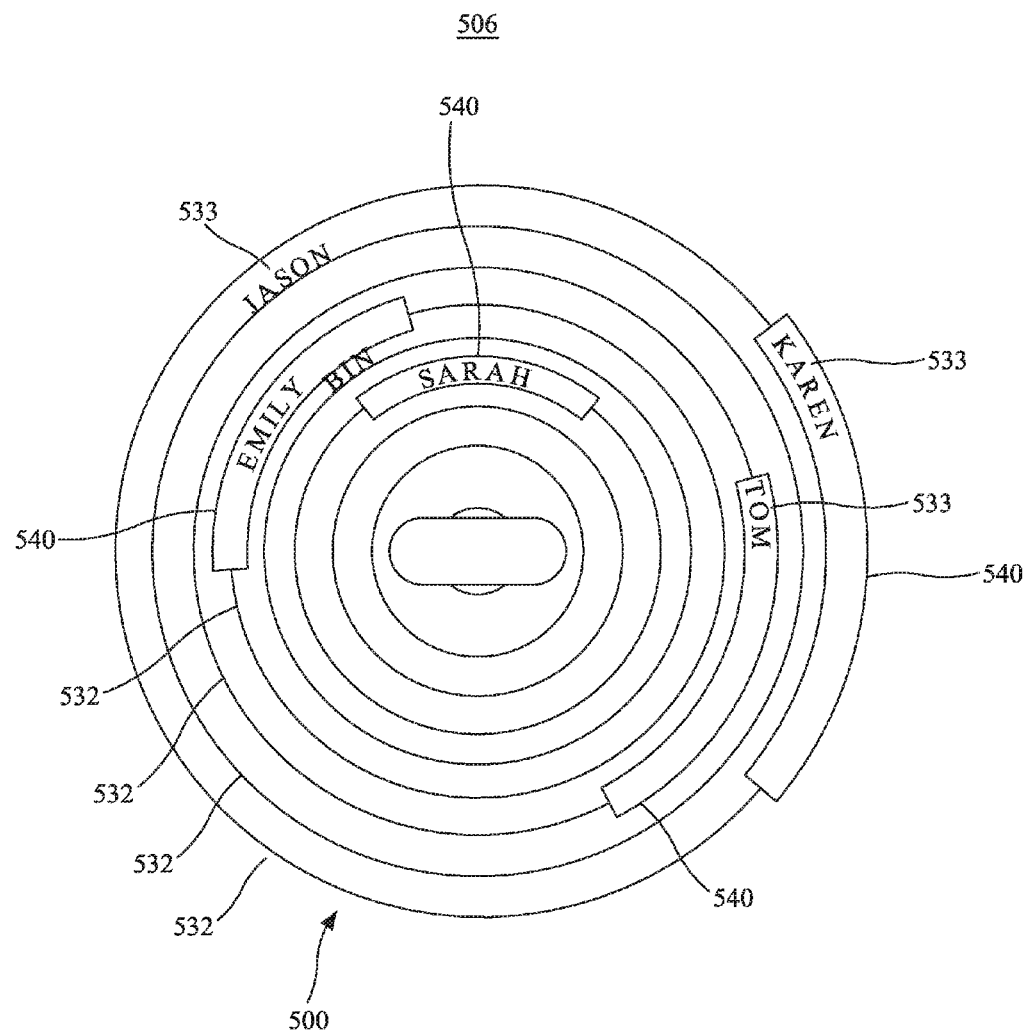
FIG. 5 is another embodiment of a remote participant simulator illustrating a confidence of corresponding to a current point of focus.

Referring to FIG. 5, in one embodiment, the remote participant simulator 506 is a screen-based or projection visualization 500 that includes a unique remote participant representation 532 for each one of the plurality of remote meeting participants arranged as a plurality of concentric, and possibly color coded, circles. In one embodiment, each unique remote participant representation includes a remote meeting participant identifier 533, i.e., an alpha numeric label, and a remote participant visual point of focus indicator 540, which is an enlarged or thickened portion of the concentric circle associated with that remote participant representation. The thickened portions indicate direction and field of view. Brightness or thickness can be used to indicate a likelihood of corresponding to an actual, current point of focus within the graphical representation.

Returning to FIG. 1, in one embodiment, the remote participant simulator 106 is oriented in the physical meeting space in accordance with the actual location of the collocated meeting participants and visual presentation materials within the physical meeting space. Therefore, the remote participant visual point of focus indicator points to an actual collocated meeting participant or visual presentation material within the physical meeting space. Alignment of the remote participant simulator or GDI within the physical meeting space can be accomplished manually or semi-automatically.

As illustrated, the remote participant simulator or GDI illustrates to the collocated meeting participants the directions in which remote participants are looking. The remote participant simulator may be embodied in a screen-based visualization, e.g., that is displayed on a tablet computer placed in the middle of a table or that is displayed on the surface of an interactive table, in a projection-based visualization that is projected directly onto a table, or in a pointer-based visualization that used beams of light or infrared radiation directed at actual collocated meeting participants or meeting presentation materials. When the remote participant simulator is used to indicated the simulated point of focus, the remote participant simulator is aligned within the physical meeting spaced so that the point of focus directions indicated by the remote participant simulator correspond with the locations being looked at in the graphical representation of the physical meeting space. This orientation is accomplished manually or semi-automatically, e.g., by a remote meeting participant saying 'I am looking at Jason', and face recognition software in conjunction with the in-room camera identifying Jason's location and re-orienting the visualization accordingly.

Figure 6:
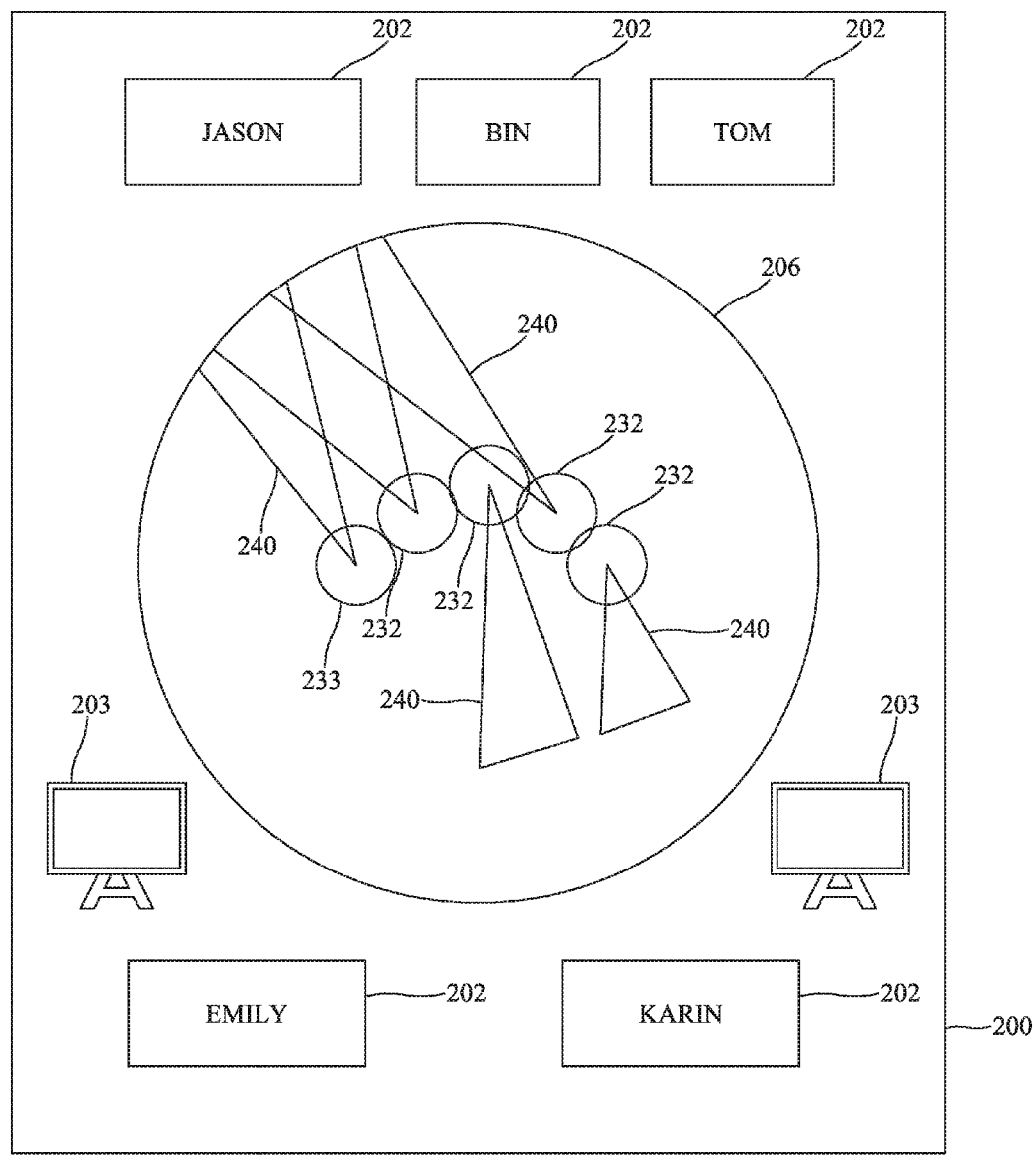
FIG. 6 is an embodiment of a remote participant simulator in a reference frame.

Referring now to FIG. 6, in one embodiment, the system for displaying the visual focus points of meeting participants includes a reference frame 200 containing a graphical representation of all collocated meeting participants 202 and all visual presentation materials 203 within the physical meeting space oriented in accordance with actual locations of all visual presentation materials within the physical meeting space. The reference frame is associated with the remote participant simulator 206, which is a screen-based or projection visualization that includes a unique remote participant representation 232 for each one of the plurality of remote meeting participants arranged as a plurality of color coded circles and each having a remote participant visual point of focus indicator 240 that is a correspondingly color coded cone. The remote participant visual point of focus indicator 240 aligns with the graphical representation in the reference frame 200 to simulate the remote participant visual point of focus for each remote meeting participant. The reference frame provides a visual image that represents the space being viewed, e.g., a small video image of the room, a small picture of the room or an abstract map of the physical meeting space and the collocated meeting participants and visual presentation materials contained in the physical meeting space.

The remote participant simulator is displayed in conjunction with the reference frame and enables collocated meeting participants to visualize the points of focus of remote meeting participants. The reference frame eliminates the need for aligning the remote participant simulator within the physical meeting space and also enables remote meeting participants to see how their points of focus are being portrayed. As illustrated, the reference frame uses rectangular icons with names showing where collocated meeting participants are located with respect to the remote meeting participant visualization. Five remote meeting participants are illustrated by distinct and separate circles, with three remote meeting participants having a point of focus directed towards Jason and two remote meeting participants having a point of focus directed towards Karin.

Figure 7:
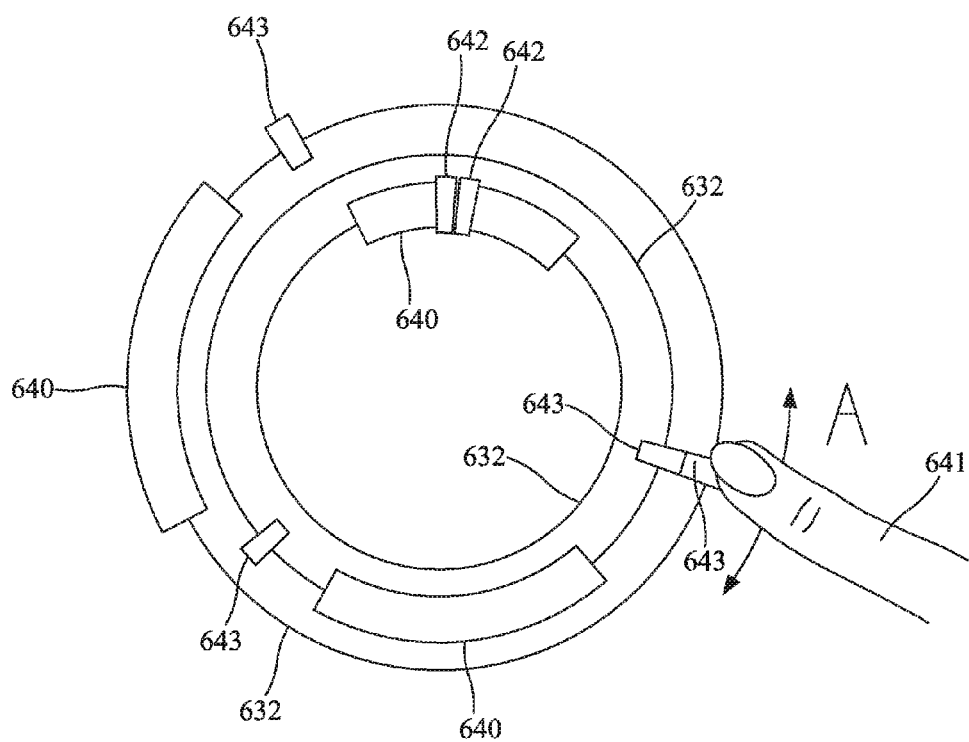
FIG. 7 is an embodiment of a remote participant simulator with controls for modifying a remote participant visual point of focus, and for restricting or expanding the areas they may view.
Figure 8:
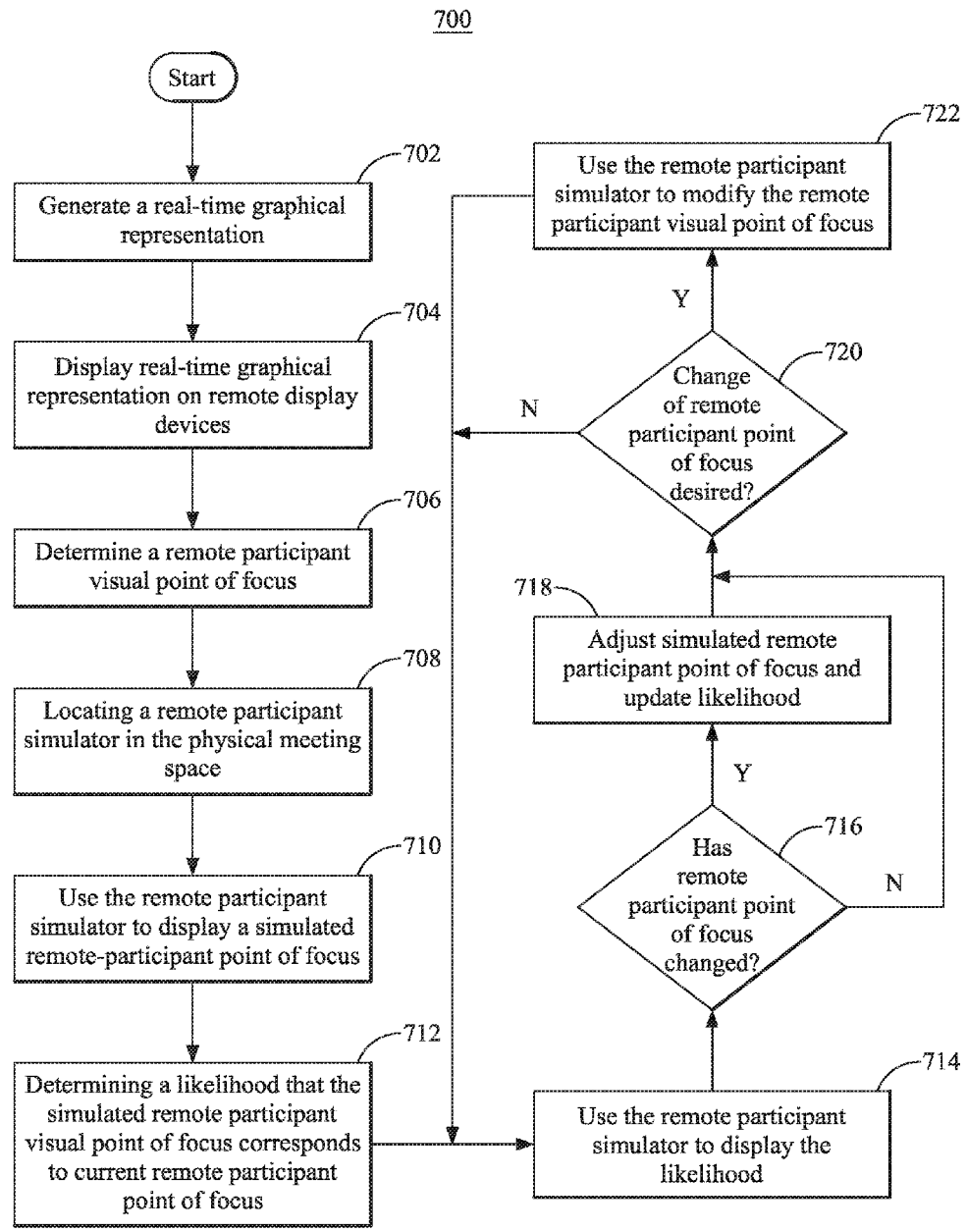
FIG. 8 is a flow chart illustrating an embodiment of method for displaying visual focus points of meeting participants.

Referring now to FIG. 7, in one embodiment, the remote participant simulator 606 is a screen-based or projection visualization that includes a unique remote participant representation 632 for each one of the plurality of remote meeting participants arranged a plurality of concentric, and possibly color coded, circles. The thin complete circles indicate the possible directions in which that remote participate orient the visual point of focus. A complete circle indicates there are no constraints for the direction of orientation. A partial circle indicates that certain directions cannot be the visual point of focus. Each unique remote participant representation includes a remote participant visual point of focus indicator 640 and field of view which is an enlarged or thickened portion of the concentric circle associated with that remote participant representation. The thickened portions indicate direction and field of view. Remote participant simulator includes, for each remote participant, at least one of a remote participant visual point of focus indicator adjustment mechanism 642 located within the remote participant visual point of focus indicator 640 to modify the remote participant visual point of focus for each remote meeting participant or a remote participant visual point of focus indicator adjustment mechanism 643 located outside the remote participant visual point of focus indicator 640 to limit or expand constraints on the possible directions in which that remote participant may look. Modification of the remote participant visual point of focus can be modified in direction or in the size of the field of view. As illustrated, the focus indicator adjustment mechanism is a pair of slides or buttons associated with each remote participant visual point of focus indicator 640. Moving each slide or button using, for example, a finger 641, as indicated by arrow A moves or adjusts the respective end of the remote participant visual point of focus indicator 640. In one embodiment, the slides or buttons are physical buttons. Alternatively, the remote participant simulator 606 is displayed on a touch sensitive screen, and the slides or buttons are graphical representations on the touch sensitive screen. Modifications to the remote participant visual point of focus are communicated to the remote meeting participant, for example, through modification of the graphical representation displayed to that remote participant.

The remote participant visual point of focus indicator adjustment mechanisms 642, 643 allow the collocated meeting participants to adjust the directions of the points of focus of the remote meeting participants either by temporarily redirecting a remote participant's point of focus, e.g., away from a person or towards an object of interest using 642. In addition, the remote participant visual point of focus indicator adjustment mechanisms 642, 643 allow collocated meeting participants to set up a persistent barrier in the points of focus, e.g., to maintain personal privacy or to prevent visual access to confidential information on a white board. The slides or buttons, 643, represent boundaries beyond which the simulated points of focus cannot be moved.

In one embodiment, the system for displaying visual focus points of meeting participants includes a simulated remote participant visual point of focus logging and storage mechanism, for example operating on the main meeting location computing system 127, to save or bookmark visual focus points. Simulated remote participant visual points of focus are frequently used by one or more remote meeting participants. The simulated remote participant visual point of focus can be saved by a remote meeting participant or by one of the collocated meeting participants. In one embodiment, simulated remote participant visual point of focus corresponding to useful locations within the physical meeting spaced, e.g., a white board, or physical model to be discussed, as saved to make viewing these locations more convenient for remote meeting participants.

Returning to FIG. 1, in one embodiment, the system for displaying visual focus points of meeting participants includes at least one or a plurality of additional remote participant simulators 104 in communication with the viewpoint monitoring mechanism. Each additional remote participant simulator is located in one of the remote locations. The additional remote participant simulators can be the same as the remote participant simulator in the physical meeting space or can be different than the remote participant simulator. The additional remote participant simulator in combination with the reference frame provide remote meeting participants with a visualization of how the collocated meeting participants are experiencing the simulated remote participant visual points of focus.

Referring now to FIG. 7, exemplary embodiments are directed to a method for displaying visual focus points of meeting participants 700. A real-time graphical representation of a physical meeting space comprising a plurality of collocated meeting participants is generated 702. In one embodiment, a video camera is used to obtain a spherical video image of the physical meeting space. The real-time graphical representation of the physical meeting space is displayed a plurality of remote display devices 704. Each remote display device is associated with one of a plurality of remote meeting participants located at remote locations separate from the physical meeting space. A remote participant visual point of focus within the real-time graphical representation displayed in each remote display device and associated with each remote meeting participant is determined 706.

A remote participant simulator is located in the physical meeting space 708. Suitable remote participant simulators include a visual indicator, a haptic indicator, an audio indicator and combinations thereof. In one embodiment, the remote participant simulator includes at least one of a display screen, a projector, a plurality of light beams, a plurality of infrared beams, a speaker and combinations thereof. In one embodiment, locating the remote participant simulator in the physical meeting space includes orienting the remote participant simulator in the physical meeting space in accordance with a location of the collocated meeting participants and visual presentation materials within the physical meeting space. In one embodiment, locating the remote participant simulator in the physical meeting space includes placing the remote participant visual point of focus indicator in a reference frame containing a graphical representation of all collocated meeting participants and all visual presentation materials within the physical meeting space oriented in accordance with actual locations of all visual presentation materials within the physical meeting space within the physical meeting space.

The remote participant simulator located in the physical meeting space is used to display a simulated remote participant visual point of focus for each meeting participant 710. The remote participant simulator includes a unique remote participant representation for each one of the plurality of remote meeting participants and a remote participant visual point of focus indicator associated with each remote participant representation to display the simulated remote participant visual point of focus. Where the remote participant simulator is oriented in the physical meeting spaced, the remote participant visual point of focus indicator is used to point to an actual collocated meeting participant or visual presentation material within the physical meeting space. Where the remote participant simulator is placed in a reference frame in the physical meeting space, the remote participant visual point of focus indicator is aligned with the graphical representation in the reference frame to simulate the remote participant visual point of focus for each remote meeting participant.

In one embodiment, a likelihood that the simulated remote participant visual point of focus for each remote meeting participant actually corresponds to a current remote participant visual point of focus is determined for each remote meeting participant 712. The remote participant simulator is used to indicate the likelihood that the simulated remote participant visual point of focus for each remote meeting participant actually corresponds to the current remote participant visual point of focus for each participant in conjunction with each simulated remote participant visual point of focus 714.

A determination is then made regarding whether the remote participant point of focus has changed 716. Alternatively, a determination can be made regarding whether the likelihood that the simulated remote participant visual point of focus for each remote meeting participant actually corresponds to the current remote participant visual point of focus drops below a given threshold level. If a given remote participant point of focus has changed or the likelihood has dropped below the desired threshold level, then at least one of the simulated remote participant point of focus and the likelihood that the simulated remote participant visual point of focus for each remote meeting participant actually corresponds to the current remote participant visual point of focus are updated 718 as is the display in the remote participant simulator.

A determination is then made regarding whether a manual, collocated meeting participant modification to the point of focus of one or more remote meeting participants is to be made 720. A determination can also be made regarding whether limits are to be set on the points of focus of one or more remote meeting participants. If the points of focus are to be changed, the remote participant simulator at the physical meeting spaced is used to modify the remote participant visual point of focus for one or more remote meeting participants 722.

In one exemplary embodiment, remote participants are video linked to a meeting. A collocated meeting participant points to whiteboard, and the remote participant indicator shows the remote participants swing around to look at the whiteboard. Therefore, the collocated meeting participant can continue knowing that the remote participants are paying attention. If the collocated meeting participant points to the whiteboard but sees that the remote participants are struggling to find the right view, the collocated meeting participant uses the remote participant simulator to move the points of focus of the remote meeting participants towards the whiteboard, thus directly controlling the view of the remote meeting participants. If the collocated meeting participant notices does not receive a single point of focus of the remote meeting participants, the collocated meeting participant can ask direct question to check. If no remote meeting participant responds, the remote meeting participants can be contacted through alternative channels such as instant messaging.

In one embodiment, the collocated meeting participant and chair of the meeting notices that the remote participant John is actively engaged in the conversation as John constantly modifies his visual point of focus to match the speaker. Therefore, the chair involves the remote meeting participant in the conversation by asking "What do you think, John?". Following a brainstorming session notes with ideas are posted all around the physical meeting space. A remote meeting participant has a visual point of focus on a given group of the posted notes, recommends another note for inclusion the group and asks a collocated participant for help in moving the recommended note into the given group indicating the group using the remote participant simulator.

Exemplary embodiments include classroom applications. Remote students are video-linked to a classroom with a teacher. It is particularly useful to know that students are paying attention. In addition, students are more likely to pay attention if the teacher is aware of their current visual points of focus. Exemplary embodiments can also be used for entertainment applications. Remote participants are video-linked to an event venue such as a play or other performance. Knowing where remote participants are directing their attention can help the director and performers judge what the audience finds interesting; this would be particularly useful in the case of improvisation, where the degree of audience interest is used as an indication to continue or change course.

Exemplary embodiments enable remote participants to have more of a presence in a meeting by allowing them to signal their attentiveness in a non-obtrusive way through direction of their visual point of focus. This allows collocated participants to draw inferences about the attention of the remote participants. The remote participants are provided with motivation for staying attentive and involved in the meeting, because their simulated gazes are visible. Exemplary embodiments provide participants with means of 'bookmarking' locations in the viewed space to make it easy to shift the viewports to significant people or objects or locations. In addition, participants are provided with the ability to restrict the focus remote participants and to direct the focus of remote participants to particular areas in the physical meeting space. These benefits are accomplished without requiring specialized or expensive equipment at either the primary meeting location or remote locations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, with the possible exception of limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 9:
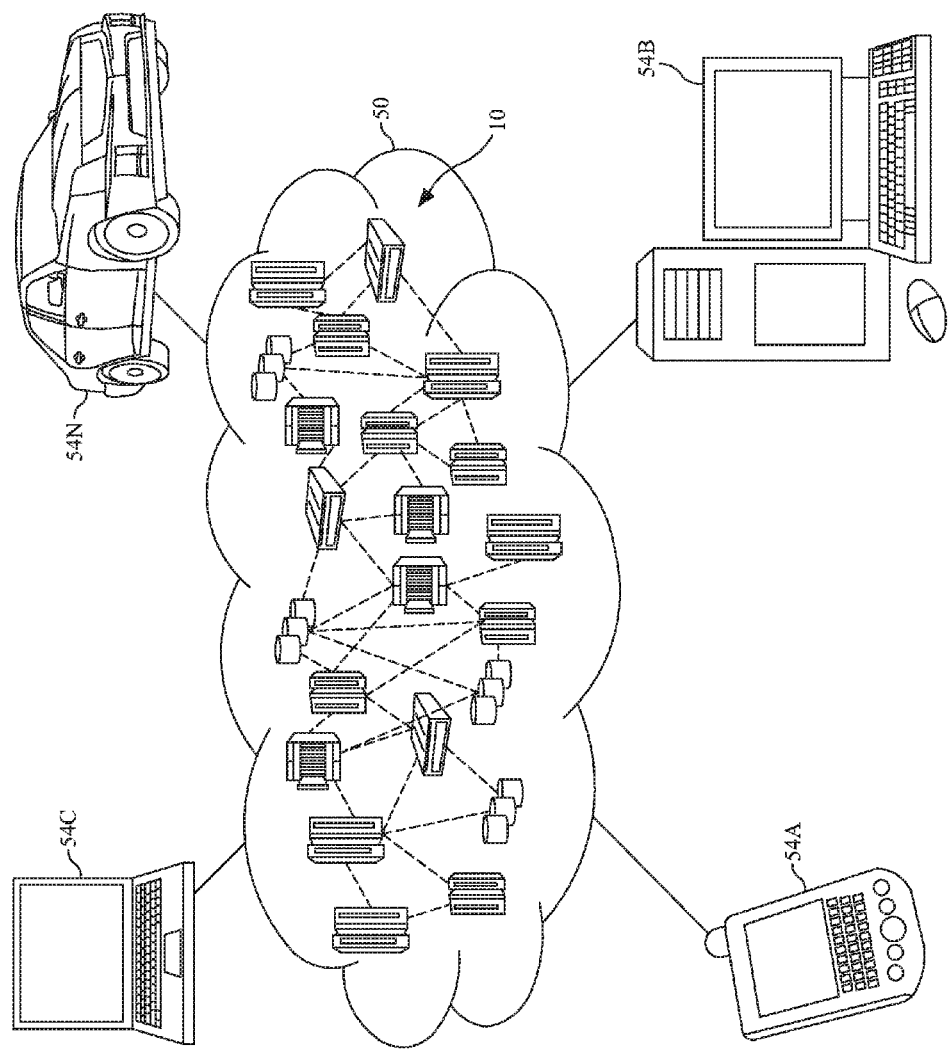
FIG. 9 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 9, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection, e.g., using a web browser.

Figure 10:
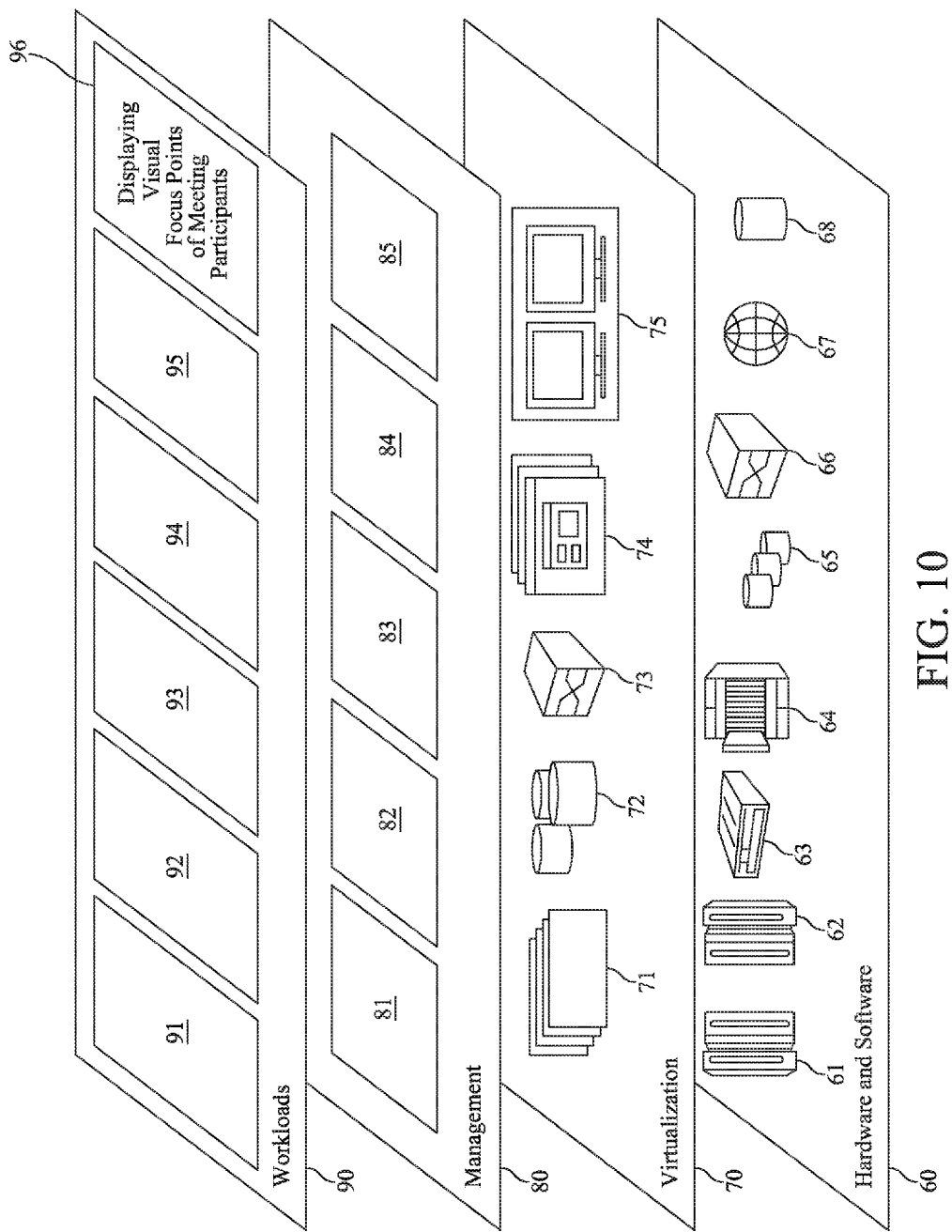
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and displaying visual focus points of meeting participants 96.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for displaying visual focus points of meeting participants in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A system for displaying visual focus points of meeting participants, the system comprising:
    an image capture device to generate a real-time graphical representation of a physical meeting space comprising a plurality of collocated meeting participants;
    a plurality of remote display devices in communication with the image capture device to display the real-time graphical representation of the physical meeting space, each remote display device associated with one of a plurality of remote meeting participants located at remote locations separate from the physical meeting space;
    a viewpoint monitoring mechanism to determine a remote participant visual point of focus within the real-time graphical representation displayed in each remote display device and associated with each remote meeting participant; and
    a remote participant simulator in communication with the viewpoint monitoring mechanism and located in the physical meeting space, the remote participant simulator comprising:
        a unique remote participant representation for each one of the plurality of remote meeting participants; and
        a remote participant visual point of focus indicator associated with each remote participant representation and simulating to the plurality of collocated meeting participants the remote participant visual point of focus within the physical meeting space for each remote meeting participant.

2. The system of claim 1, wherein the image capture device comprises a still camera, a fixed field of view video camera, a pan-tilt-zoom video camera or combinations thereof.

3. The system of claim 1, wherein the real-time graphical representation of the physical meeting space comprises a spherical video image.

4. The system of claim 1, wherein the real-time graphical representation of the physical meeting space comprises all collocated meeting participants and all visual presentation materials within the physical meeting space.

5. The system of claim 1, wherein the remote display devices comprise computer monitors, video displays, smartphones, tablet computers or combinations thereof.

6. The system of claim 1, wherein the viewpoint monitoring mechanism comprises video cameras, point and click devices, remote display content monitors, text inputs or combinations thereof.

7. The system of claim 1, wherein the remote participant simulator comprises a visual indicator, a haptic indicator, an audio indicator or combinations thereof.

8. The system of claim 1, wherein the remote participant simulator comprises at least one of a display screen, a projector, a plurality of light beams, a plurality of infrared beams, a speaker and combinations thereof.

9. The system of claim 1, wherein:
the remote participant simulator is oriented in the physical meeting space in accordance with a location of the collocated meeting participants and visual presentation materials within the physical meeting space; and
the remote participant visual point of focus indicator points to an actual collocated meeting participant or visual presentation material within the physical meeting space.

10. The system of claim 1, further comprising a reference frame comprising a graphical representation of all collocated meeting participants and all visual presentation materials within the physical meeting space oriented in accordance with actual locations within the physical meeting space;
wherein the remote participant visual point of focus indicator aligns with the graphical representation in the reference frame to simulate the remote participant visual point of focus for each remote meeting participant.

11. The system of claim 1, wherein the remote participant simulator further comprises a remote participant visual point of focus indicator adjustment mechanism to modify the remote participant visual point of focus for each remote meeting participant.

12. The system of claim 1, further comprising a plurality of additional remote participant simulators in communication with the viewpoint monitoring mechanism, each additional remote participant simulator located in one of the remote locations.

13. A method for displaying visual focus points of meeting participants, the method comprising:
generating a real-time graphical representation of a physical meeting space comprising a plurality of collocated meeting participants;
displaying the real-time graphical representation of the physical meeting space on a plurality of remote display devices, each remote display device associated with one of a plurality of remote meeting participants located at remote locations separate from the physical meeting space;
determining a remote participant visual point of focus within the real-time graphical representation displayed in each remote display device and associated with each remote meeting participant; and
using a remote participant simulator located in the physical meeting space to display to the plurality of collocated meeting participants a simulated remote participant visual point of focus within the physical meeting space for each meeting participant, the remote participant simulator comprising:
a unique remote participant representation for each one of the plurality of remote meeting participants; and
a remote participant visual point of focus indicator associated with each remote participant representation to display the simulated remote participant visual point of focus.

14. The method of claim 13, wherein generating the real-time graphical representation further comprises using a video camera to obtain a spherical video image of the physical meeting space.

15. The method of claim 13, wherein the remote participant simulator comprises a visual indicator, a haptic indicator, an audio indicator or combinations thereof.

16. The method of claim 13, wherein the remote participant simulator comprises at least one of a display screen, a projector, a plurality of light beams, a plurality of infrared beams, a speaker and combinations thereof.

17. The method of claim 13, further comprising:
orienting the remote participant simulator in the physical meeting space in accordance with a location of the collocated meeting participants and visual presentation materials within the physical meeting space; and
using the remote participant visual point of focus indicator to point to an actual collocated meeting participant or visual presentation material within the physical meeting space.

18. The method of claim 13, wherein;
the method further comprises placing remote participant visual point of focus indicator in a reference frame comprising a graphical representation of all collocated meeting participants and all visual presentation materials within the physical meeting space oriented in accordance with actual locations within the physical meeting space; and
using a remote participant simulator further comprises aligning the remote participant visual point of focus indicator with the graphical representation in the reference frame to simulate the remote participant visual point of focus for each remote meeting participant.

19. The method of claim 13, further comprising:
determining a likelihood that the simulated remote participant visual point of focus for each remote meeting participant actually corresponds to a current remote participant visual point of focus for each participant; and
using the remote participant simulator to indicate the likelihood that the simulated remote participant visual point of focus for each remote meeting participant actually corresponds to the current remote participant visual point of focus for each participant in conjunction with each simulated remote participant visual point of focus.

20. A non-transitory computer-readable storage medium containing a computer-readable code that when read by a computer causes the computer to perform a method for displaying visual focus points of meeting participants, the method comprising:
generating a real-time graphical representation of a physical meeting space comprising a plurality of collocated meeting participants;
displaying the real-time graphical representation of the physical meeting space on a plurality of remote display devices, each remote display device associated with one of a plurality of remote meeting participants located at remote locations separate from the physical meeting space;

determining a remote participant visual point of focus within the real-time graphical representation displayed in each remote display device and associated with each remote meeting participant; and using a remote participant simulator located in the physical meeting space to display to the plurality of collocated meeting participants a simulated remote participant visual point of focus within the physical meeting space for each meeting participant, the remote participant simulator comprising:

a unique remote participant representation for each one of the plurality of remote meeting participants; and a remote participant visual point of focus indicator associated with each remote participant representation to display the simulated remote participant visual point of focus.

\* \* \* \* \*